US011879546B2

United States Patent
Kaufhold et al.

(10) Patent No.: US 11,879,546 B2
(45) Date of Patent: Jan. 23, 2024

(54) PARKING LOCK AND DRIVE TRAIN WITH SUCH PARKING LOCK

(71) Applicant: BorgWarner Inc., Auburn Hills, MI (US)

(72) Inventors: Tobias Kaufhold, Sanhausen (DE); Friedrich Philipp Brezger, Karsruhe (DE); Oliver Groneberg, St. Leon-Rot (DE); Florian Schneider, Hockenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/337,832

(22) Filed: Jun. 20, 2023

(65) Prior Publication Data
US 2023/0417324 A1    Dec. 28, 2023

(30) Foreign Application Priority Data

Jun. 25, 2022 (DE) .................. 102022002300.8

(51) Int. Cl.
*B60K 17/02* (2006.01)
*F16H 63/34* (2006.01)
*B60K 1/00* (2006.01)

(52) U.S. Cl.
CPC .......... *F16H 63/3425* (2013.01); *B60K 1/00* (2013.01); *B60K 17/02* (2013.01)

(58) Field of Classification Search
CPC ............. F16H 63/3425; F16H 63/3466; F16H 2200/0034; B60K 1/00; B60K 17/02; F16D 13/385
See application file for complete search history.

(56) References Cited

U.S. PATENT DOCUMENTS

2017/0167546 A1* 6/2017 Satoi .................. F16D 21/06
2022/0128099 A1* 4/2022 Kraeuter .............. F16D 28/00

FOREIGN PATENT DOCUMENTS

| DE | 10029628 A1 | 3/2001 |
| DE | 102006046712 A1 | 4/2008 |
| DE | 102009015455 A1 | 9/2010 |

(Continued)

OTHER PUBLICATIONS

English language abstract and machine-assisted English translation for DE 100 29 628 A1 extracted from espacenet.com database on Aug. 4, 2023, 9 pages.

(Continued)

*Primary Examiner* — Jacob S. Scott
*Assistant Examiner* — Farhana Pervin
(74) *Attorney, Agent, or Firm* — Howard & Howard Attorneys PLLC

(57) ABSTRACT

The present invention relates to a parking lock for the drive train of a motor vehicle, comprising a pivotable locking lever and a locking toothing, wherein the locking lever can be pivoted from a release position, in which the locking toothing is rotatable relative to the locking lever, into a locking position, in which the locking lever engages with the locking toothing and thus fixes the locking toothing. The locking toothing is provided on a multiple disk carrier of a multiple disk clutch. In addition, the present invention relates to a drive train having such a parking lock.

20 Claims, 1 Drawing Sheet

(56) References Cited

FOREIGN PATENT DOCUMENTS

Figure 1:
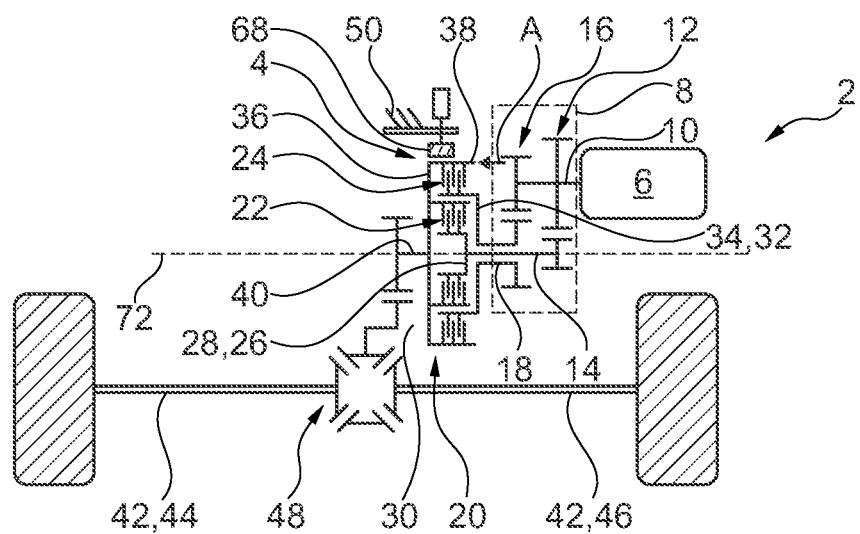

DE   102018212199 A1      1/2020
DE   102019107517 B3 *    7/2020

OTHER PUBLICATIONS

English language abstract and machine-assisted English translation for DE 10 2006 046 712 A1 extracted from espacenet.com database on Aug. 4, 2023, 9 pages.
English language abstract and machine-assisted English translation for DE 110 2009 015 455 A1 extracted from espacenet.com database on Aug. 4, 2023, 6 pages.
Machine-assisted English language abstract and machine-assisted English translation for DE 10 2018 212 199 A1 extracted from espacenet.com database on Aug. 4, 2023, 12 pages.

* cited by examiner

PARKING LOCK AND DRIVE TRAIN WITH SUCH PARKING LOCK

CROSS-REFERENCE TO RELATED APPLICATIONS

This application claims priority pursuant to 35 U.S.C. 119(a) to German Application No. 102022002300.8, filed Jun. 25, 2022, which application is incorporated herein by reference in its entirety.

DESCRIPTION

The present invention relates to a parking lock for the drive train of a motor vehicle, comprising a pivotable locking lever and a locking toothing, wherein the locking lever can be pivoted from a release position, in which the locking toothing is rotatable relative to the locking lever, into a locking position, in which the locking lever engages with the locking toothing and thus fixes the locking toothing. In addition, the present invention relates to a drive train for a motor vehicle with such a parking lock.

Parking locks for the drive train of a motor vehicle are known from practice, which have a pivotable locking lever and a parking lock wheel which has a locking toothing facing the locking lever and which is usually arranged on a gear shaft in a rotationally fixed manner. Thus, the locking lever can be pivoted from a release position, in which the parking lock wheel together with the locking toothing can be rotated relative to the locking lever, into a locking position, in which the locking lever engages in the locking toothing of the parking lock wheel and thus fixes the parking lock wheel relative to the locking lever. Consequently, the gear shaft, to which the parking lock wheel is connected for conjoint rotation, is also rotatable in the release position of the locking lever and is fixed in the locking position of the locking lever, so that the gear shaft can no longer be rotated in the locking position.

The known parking locks have proven their worth, but are in need of improvement insofar as they require a large installation space and are very heavy. Moreover, the production is relatively costly.

It is therefore an object of the present invention to develop a parking lock of the type described so that it requires little installation space, is lightweight and can be manufactured relatively easily. In addition, the underlying object of the present invention is to create a drive train for a motor vehicle with such an advantageous parking lock.

This object is achieved by the features specified in patent claims 1 and 8, respectively. Advantageous embodiments of the invention are the subject matter of the dependent claims.

The parking lock according to the invention is designed for the drive train of a motor vehicle. The parking lock comprises a pivotable locking lever. The pivotable locking lever may, for example, be pivotably arranged on a fixed component of the drive train, such as a fixed housing. In addition, the locking lever may preferably be biased into one of the positions mentioned below. Furthermore, the parking lock comprises a locking toothing, which is preferably a toothing running in the circumferential direction and comprising teeth and spaces between the teeth. The pivotable locking lever can be pivoted from a release position, in which the locking toothing can be rotated relative to the locking lever, into a locking position, in which the locking lever engages with the locking toothing and thus fixes the locking toothing, so that the locking toothing can no longer be rotated in at least one circumferential direction, preferably in both circumferential directions, but rather is supported on the locking lever. Whereas in conventional parking locks a parking lock wheel is provided which on the one hand is arranged in a rotationally fixed manner on a gear shaft and on the other hand has the mentioned locking toothing, in the parking lock according to the invention the locking toothing is provided on a multiple disk carrier of a multiple disk clutch. This has the advantage that a bulky and heavy parking lock wheel, which would have to be fixed to an internal shaft, is not required, and therefore a particularly compact and lightweight parking lock can be created, especially as the multiple disk carrier of the multiple disk clutch is already connected to a shaft or similar for conjoint rotation, so that there is no need to provide a parking lock wheel, which would have to reach as far as this shaft. Rather, the multiple disk carrier takes over the function of the parking lock wheel at least partially or completely.

In a preferred embodiment of the parking lock according to the invention, the locking toothing is provided on a multiple disk carrier section of the multiple disk carrier. The multiple disk carrier section is preferably formed by a substantially tubular or sleeve-shaped section of the multiple disk carrier. The multiple disk carrier section of a multiple disk carrier offers a particularly easily accessible section of the multiple disk carrier, so that the arrangement of the locking toothing and assignment of the locking lever to the locking toothing on the multiple disk carrier section is simplified.

In a further preferred embodiment of the parking lock according to the invention, the multiple disk carrier section, on which the locking toothing of the parking lock is provided, is designed as an outer multiple disk carrier section, which is advantageous in that the outer multiple disk carrier section, as a section supporting the outer multiple disks, is arranged particularly far outwards in the radial direction and can thus be arranged particularly close to a locking lever, which is generally also arranged outside the locking toothing in the radial direction.

In an advantageous embodiment of the parking lock according to the invention, in which the locking toothing is provided on the outer multiple disk carrier section of the multiple disk carrier, the locking toothing is provided on said outer multiple disk carrier section in such a way that it faces outwards in the radial direction in order to ensure easy assignment to and simple interaction with the pivotable locking lever of the parking lock.

As already indicated above, the multiple disk carrier section is to be substantially tubular or sleeve-shaped. In a further preferred embodiment of the parking lock according to the invention, the multiple disk carrier section has a circumferential, undulating support wall, so that the support wall forms a radially inwardly and a radially outwardly facing toothing.

In a further advantageous embodiment of the parking lock according to the invention, the multiple disk clutch is designed as a concentric dual multiple disk clutch with an inner clutch and an outer clutch. The multiple disk carrier on which the locking toothing of the parking lock is provided is preferably a multiple disk carrier of the outer clutch, particularly preferably an outer multiple disk carrier of the outer clutch, in order to be able to place the locking toothing as far as possible in the radial direction against the outside of the dual multiple disk clutch, where a simple, space-saving and direct interaction between the pivotable locking lever and the locking toothing is ensured.

In a particularly preferred embodiment of the parking lock according to the invention, the locking toothing is formed in one piece with the multiple disk carrier. Consequently, the locking toothing can already be formed together with the multiple disk carrier without the need for an additional component such as a parking lock wheel within the parking lock, wherein the locking toothing can be produced, for example, within the scope of a sheet-metal shaping process carried out to produce the multiple disk carrier or the multiple disk carrier section. Thus, in this embodiment, it is also preferred if the locking toothing is formed in one piece with the multiple disk carrier section of the multiple disk carrier, wherein it has been found to be particularly simple and advantageous if the locking toothing is formed by one of the toothings of the support wall, which are present anyway and have already been mentioned previously. In this case, it is again advantageous if the toothing of the support wall, which forms the locking toothing formed in one piece with the multiple disk carrier section, is the toothing of the support wall of the multiple disk carrier section facing outwards in the radial direction. In addition, it is preferred if the radially inwardly facing toothing of the support wall carries disks.

Although the above-described embodiment, in which the locking toothing is formed in one piece with the disk carrier, has clear advantages in terms of weight, installation space and manufacture, in certain applications a further preferred embodiment of the parking lock according to the invention may also be advantageous, in which the locking toothing is provided on a toothed rim fastened to the multiple disk carrier, preferably the multiple disk carrier section of the multiple disk carrier. In this way, a toothed rim surrounding the multiple disk carrier section of the multiple disk carrier from the outside can equally form an expansion or burst protection means for the multiple disk carrier section, which is generally tubular. In this embodiment, it is moreover advantageous if said toothed rim has, in addition to the locking toothing, a connecting toothing which, while fixing the toothed rim to the multiple disk carrier section in a rotationally fixed manner, engages with one of the toothings of the support wall, as necessary the radially outwardly facing toothing, in order to ensure a secure rotationally fixed arrangement of the toothed rim on the multiple disk carrier. Although reference is always made herein to a connecting toothing, this does not necessarily have to comprise a plurality of teeth; rather, the connecting toothing may also be formed by a single tooth or two or more teeth. In order to ensure a particularly simple assembly of the toothed rim with the locking toothing and the connecting toothing on the multiple disk carrier section of the multiple disk carrier, the connecting toothing on the toothed rim and the toothing of the support wall, as necessary, form the radially outwardly facing toothing of the support wall, preferably form an axial plug connection, so that the multiple disk carrier section and the toothed rim merely have to be plugged together in the axial direction in order to achieve a connection for conjoint rotation in a particularly simple and quick way. An axial fixation of the toothed rim in the axial direction opposite to the assembly direction can then preferably be achieved via a securing ring.

In a further advantageous embodiment of the parking lock according to the invention, the multiple disk clutch is arranged in a fixed clutch housing. The clutch housing can, for example, be formed here by a section of a transmission housing and/or a section of an engine housing. Since the clutch housing is stationary, it does not rotate, unlike the components of the multiple disk clutch. In this embodiment, it is preferred if the locking lever is arranged on the clutch housing so as to be pivotable between the release position and the locking position. It has also been found to be advantageous if the pivot axis of the locking lever extends parallel to the rotation axis of the multiple disk clutch. In addition, it is preferred if the locking lever is pivotable by means of a locking roller or by means of a locking cone which interacts in a known manner with the locking lever in order to pivot it. The pivoting—as already indicated above—is preferably performed against the biasing force of a spring element, via which the locking lever is particularly preferably biased into one of the two positions mentioned.

In a further advantageous embodiment of the parking lock according to the invention, the locking lever comprises a locking tooth which, in the locking position, engages with a space between teeth of the locking toothing. The locking tooth may be fundamentally a projection protruding beyond the lever-shaped section of the locking lever. Generally, one locking tooth is sufficient in such a design. However, in certain applications, it may be advantageous for the locking lever to have two or more locking teeth that engage with two or more separate spaces between teeth of the locking toothing when the locking lever is in the locking position.

In a further preferred embodiment of the parking lock according to the invention, the locking lever forms a first locking lever, wherein a second locking lever is further provided. The second locking lever can support and/or supplement the action of the first locking lever. Thus, in this embodiment, it is preferred if the second locking lever can be pivoted in the opposite direction to the first locking lever between the release position and the locking position. If the first and second locking levers are to be pivoted into the release position, they are thus pivoted in opposite directions. If both locking levers are to be pivoted into the locking position, they must likewise be pivoted in opposite directions. In addition, in this embodiment it is preferred if the locking toothing in a first circumferential direction can be supported or is supported, optionally exclusively, on the first locking lever in its locking position and in a second circumferential direction, opposite the first circumferential direction, can be supported or is supported, optionally exclusively, on the second locking lever in its locking position. Thus, in this variant, the locking in one of the two circumferential directions is assigned to each of the two locking levers, optionally exclusively.

The drive train for a motor vehicle according to the invention has a drive unit, that is to say for example an internal combustion engine, an electric motor, a hybrid engine or an electric machine, and a parking lock of the type according to the invention. The multiple disk clutch has an input side, which is directly or indirectly connected to the drive unit in terms of rotational drive, and an output side, which is directly or indirectly connected to a first vehicle axle in terms of rotational drive. The input side and output side can be brought into rotary driving connection with each other via the multiple disk clutch.

In a preferred embodiment of the drive train according to the invention, the multiple disk carrier of the multiple disk clutch forms the input side or the output side of the multiple disk clutch, wherein, for example, a multiple disk carrier forming the input side in a normally closed multiple disk clutch and a multiple disk carrier forming the output side in a normally open multiple disk clutch may be advantageous, although a reverse arrangement is also possible.

In a further advantageous embodiment of the drive train according to the invention, the drive unit is also in rotary driving connection with a second vehicle axle, bypassing the multiple disk clutch. Consequently, the torque transmission between the drive unit and the second vehicle axle does not run via the multiple disk clutch. This means that an all-wheel drive coupling can be achieved through the multiple disk clutch if required, when the multiple disk clutch is closed and the motor vehicle only has the first and second vehicle axles.

According to a further advantageous embodiment of the drive train according to the invention, the aforementioned first or/and second vehicle axle is in rotary driving connection with the output side of the multiple disk clutch or the drive unit via a differential gear.

In a particularly preferred embodiment of the drive train according to the invention, a 2-speed transmission is arranged between the drive unit and the multiple disk clutch designed as a concentric dual multiple disk clutch, wherein a first transmission output shaft of a first gear is in rotary driving connection with an input side of the inner clutch and a second transmission output shaft of a second gear is in rotary driving connection with an input side of the outer clutch. First and second gears here merely indicate that different transmission ratios are involved. As already discussed with reference to the parking lock itself, it is also preferred in this embodiment of the drive train if the locking toothing of the parking lock is provided on a multiple disk carrier of the outer clutch, preferably the outer multiple disk carrier of the outer clutch. In the case of a concentric dual multiple disk clutch, the disk packs of the two multiple disk clutches are arranged in a nested manner in the radial direction in order to achieve a particularly compact structure in the axial direction. In order to transfer this advantage to the drive train according to the invention, it is additionally preferred in the present embodiment if the locking toothing or/and the pivotable locking lever is/are also arranged in a radially nested manner with the disk packs of the inner and outer clutch.

The drive train described above, in particular the embodiment with the 2-speed transmission, is particularly advantageous for use in a wholly or partially electrically operated motor vehicle, which is why the drive unit in a further preferred embodiment of the drive train according to the invention is an electric drive unit, preferably formed by an electric motor or an electric machine. In contrast to the electric motor, the electric machine has the advantage that it can be used not only as a motor, but rather also as a generator.

Figure 2:
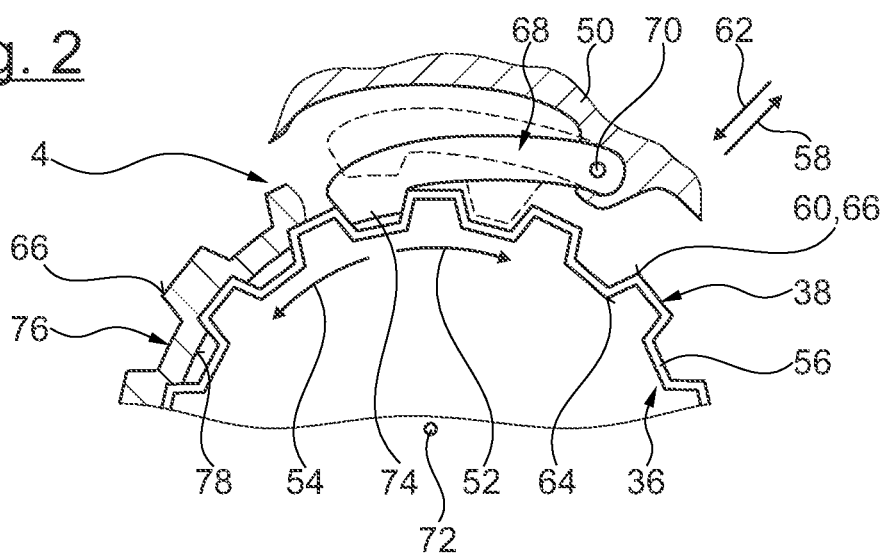
Figure 3:
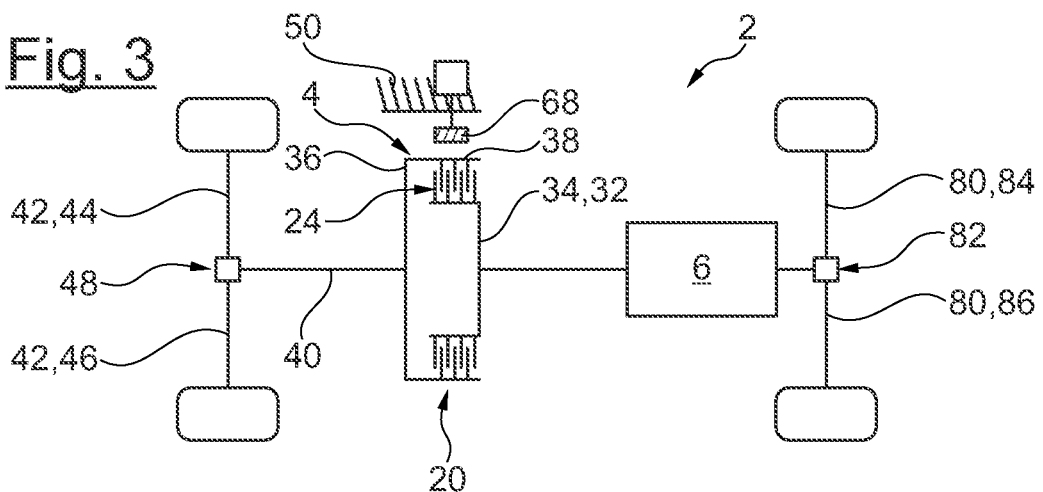

The invention is explained in more detail below using exemplary embodiments with reference to the attached drawings. In the following:

FIG. 1 shows a schematic representation of a first embodiment of a drive train with a parking lock, FIG. 2 shows a partial view of the parking lock from FIG. 1 in the direction of arrow A, and FIG. 3 shows a schematic representation of a second embodiment of a drive train with a parking lock.

FIGS. 1 and 2 show a first embodiment of a drive train 2 for a motor vehicle with a parking lock 4. The drive train 2 has a drive unit 6. The drive unit 6 may, for example, be an internal combustion engine, an electric motor or an electric machine, wherein the latter may be operated both as a motor and as a generator. In principle, it is preferred for the drive train 2 shown if the drive unit 6 is an electric drive unit, that is to say an electric motor or an electric machine. In an advantageous embodiment, the drive unit 6 may also be a hybrid drive that combines an internal combustion engine with an electric motor or an electric machine.

In the torque transmission path, the drive unit 6 is followed by a transmission 8, which in the embodiment shown is designed as a 2-speed transmission. The transmission 8 has a transmission input shaft 10, which is in direct or indirect driving connection with the output side of the drive unit 6. Two gears are realized by the transmission 8, namely a first gear 12, which is associated with a first transmission output shaft 14, and a second gear 16, which is associated with a second transmission output shaft 18. The designation "first and second gear" merely indicates different transmission ratios.

In the torque transmission path, the transmission 8 is followed by a multiple disk clutch 20, which is designed as a concentric dual multiple disk clutch. The multiple disk clutch 20, which is designed as a dual multiple disk clutch, has an inner clutch 22 or an inner disk pack and an outer clutch 24 or an outer disk pack. Since this is a concentric dual multiple disk clutch, the inner and outer clutches 22, 24 are nested in the radial direction, or more precisely, the outer clutch 24 or the outer disk pack surrounds the inner clutch 22 or the inner disk pack, respectively, in the radial direction from the outside.

The input side 26 of the inner clutch 22 is formed by an inner multiple disk carrier 28, wherein the input side 26 is in rotary driving connection with the first transmission output shaft 14. In addition, the inner clutch 22 has an outer multiple disk carrier 30 on the output side. The second transmission output shaft 18, on the other hand, is in rotary driving connection with an input side 32 of the outer clutch 24, wherein the input side 32 of the outer clutch 24 is formed by an inner multiple disk carrier 34. In addition, the outer clutch 24 has an outer multiple disk carrier 36 with a substantially tubular or sleeve-shaped multiple disk carrier section 38. Consequently, in the embodiment shown, the multiple disk carrier section 38 is an outer multiple disk carrier section 38. The two output-side outer multiple disk carriers 30, 36 of the multiple disk clutch 20, which is in the form of a dual multiple disk clutch, are connected to one another for conjoint rotation and form a common output side 40. This output side 40 is in rotary driving connection with a first vehicle axle 42, wherein the first vehicle axle 42 is composed of two half-axles 44, 46, which are in rotary drive connection with the output side 40 via a differential gear 48. The input sides 26, 32 can be brought selectively into rotary driving connection with the output side 40 via the multiple disk clutch 20 in order to achieve two different transmission ratios via the gears 12, 16 of the transmission 8 and the multiple disk clutch 20.

The multiple disk clutch 20 is arranged within a fixed clutch housing 50, which is at least suggested in FIGS. 1 and 2. The clutch housing 50 may, for example, be completely or at least partially formed by a section of a transmission housing, for example by a section of a transmission housing of the transmission 8. FIG. 2 further shows the structure of the multiple disk carrier section 38 of the outer multiple disk carrier 36 of the outer clutch 24. Thus, the multiple disk carrier section 38 formed as an outer multiple disk carrier section has a peripheral support wall 56 in the circumferential direction 52, 54, so that a substantially sleeve-shaped or tubular multiple disk carrier section 38 is created. In this case, the support wall 56 runs in an undulating manner in the circumferential direction 52, 54, so that the support wall 56 forms a toothing 60 facing outwards in the radial direction 58 and a toothing 64 facing inwards in the opposite radial direction 62. The multiple disk carrier section 38, as well as preferably the entire outer multiple disk carrier 36, is preferably formed as a sheet-metal molding, such that the toothings 60, 64 have already been produced within the scope of the sheet-metal molding process of the outer multiple disk carrier 36.

The toothing 60 of the multiple disk carrier section 38 facing outwards in the radial direction 58 equally forms a locking toothing 66 of the parking lock 4. Consequently, the locking toothing 66 is provided on the multiple disk carrier of the outer clutch 24, which is designed as an outer multiple disk carrier 36, more precisely on the multiple disk carrier section 38, which is designed as an outer multiple disk carrier section, with the locking toothing 66 facing outwards in the radial direction 58. The locking toothing 66 is thus also formed in one piece with the outer multiple disk carrier 36 or its multiple disk carrier section 38, especially since the locking toothing 66 is formed by the toothing 60 of the support wall 56.

Moreover, a pivotable locking lever 68 of the parking lock 4 is associated with the locking toothing 66. The locking lever 68 is arranged on the clutch housing 50 so as to be pivotable about a pivot axis 70, wherein the pivoting is preferably effected by means of a locking roller known from the prior art or a locking cone known from the prior art, which are not shown in the figures for reasons of clarity. The pivot axis 70 of the locking lever 68 preferably extends parallel to a rotation axis 72 of the multiple disk clutch 20 or of the outer multiple disk carrier 36 of the multiple disk clutch 20. The locking lever 68 is arranged in the radial direction 58, 62 nested with the inner and outer clutch 22, 24, more precisely, the locking lever 68 is arranged in the radial direction 58 outside the inner and outer clutch 22, 24 and associated with the locking toothing 66. The locking lever 68 also has a locking tooth 74 projecting inwards in the radial direction 62.

The locking lever 68 can be pivoted about the pivot axis 70 from the release position, indicated by dashed lines in FIG. 2, in which the outer multiple disk carrier 36 can be rotated relative to the fixed clutch housing 50, into the locking position shown in FIG. 2, in which the locking tooth 74 engages with a space between teeth of the locking toothing 66 so that the locking lever 68 engages with the locking toothing 66 and thus fixes the locking toothing 66 and thus the outer multiple disk carrier 36 of the multiple disk clutch 20 in the circumferential directions 52, 54. Although not shown in FIG. 2, two or more locking teeth 74 can also be provided on the locking lever 68 and in the locking position engage with two or more separate spaces between teeth of the locking toothing 66.

In addition, only one locking lever 68 is shown in the parking lock 4 according to FIGS. 1 and 2. Alternatively, however, the locking lever 68 could form a first locking lever, while a second locking lever is also provided (not shown). This second locking lever could be pivoted in the opposite direction to the first locking lever 68 between the release position and the locking position, wherein the locking toothing 66 could be supportable or supported particularly preferably in a first circumferential direction 52, as necessary exclusively, on the first locking lever 68 in its locking position and in a second circumferential direction 54 opposite the first circumferential direction 52, as necessary exclusively, on the second locking lever in its locking position.

FIG. 2 also shows a second variant of the parking lock 4, in which the locking toothing 66 is not formed by the multiple disk carrier section 38 itself, as in the first variant, but rather a toothed rim 76 is provided, which is fastened to the multiple disk carrier section 38 of the outer multiple disk carrier 36 and has the locking toothing 66 on its side facing outwards in the radial direction 58, as is at least suggested on the left-hand side in FIG. 2. In addition, in the second variant shown, the toothed rim 76 has a connecting toothing 78 facing inwards in the radial direction 62, which engages with the toothing 60 of the support wall 56 of the multiple disk carrier section 38 and thus secures the toothed rim 76 in a rotationally fixed manner on the multiple disk carrier section 38 in the circumferential directions 52, 54. In this case, the connecting toothing 78 and the toothing 60 of the support wall 56 form an axial plug connection to enable particularly simple assembly and disassembly. Although the connecting toothing 78 is shown here with two or more teeth, in principle it is possible for only one tooth to be provided in the connecting toothing 78 in order to effect the rotationally fixed arrangement.

FIG. 3 shows the schematic representation of a second embodiment of a drive train 2, which substantially corresponds to the drive train 2 according to FIGS. 1 and 2, so that only the differences are discussed below, the same reference numerals are used for the same or similar parts and the above description otherwise applies accordingly.

As can be seen from FIG. 3, the multiple disk clutch 20 in the second embodiment according to FIG. 3 is designed as a single multiple disk clutch and not as a dual multiple disk clutch. Also, the input side 32 formed by the inner multiple disk carrier 34 is here, by way of example, not connected to the output side of the drive unit 6 via a transmission 8. Moreover, the drive unit 6 is designed to be in rotary driving connection with a second vehicle axle 80, bypassing the multiple disk clutch 20, wherein the drive unit 6 in turn is in rotary driving connection with the half-axles 84, 86 of the second vehicle axle 80 via a differential gear 82. Consequently, thanks to the multiple disk clutch 20, an all-wheel drive can be realized in the drive train 2 according to FIG. 3, in which only two vehicle axles 42, 80 are provided.

LIST OF REFERENCE NUMERALS 2 drive train
4 parking lock
6 drive unit
8 transmission
transmission input shaft
12 first gear
14 first transmission output shaft
16 second gear
18 second transmission output shaft
20 multiple disk clutch
22 inner clutch
24 outer clutch
26 input side
28 inner multiple disk carrier
30 outer multiple disk carrier
32 input side
34 inner multiple disk carrier
36 outer multiple disk carrier
38 multiple disk carrier section
40 output side
42 first vehicle axle
44 half-axle
46 half-axle
48 differential gear
50 clutch housing
52 circumferential direction
54 circumferential direction
56 support wall
58 radial direction
60 toothing
62 radial direction 64 toothing
66 locking toothing
68 locking lever
70 pivot axis
72 rotation axis
74 locking tooth
76 toothed rim
78 connecting toothing
80 second vehicle axle
82 differential gear
84 half-axle
86 half-axle

What is claimed is:

1. A parking lock for a drive train of a motor vehicle, comprising a pivotable locking lever and a locking toothing, wherein the locking lever is rotatable from a release position, in which the locking toothing is rotatable relative to the locking lever, into a locking position, in which the locking lever engages with the locking toothing and thus fixes the locking toothing, wherein the locking toothing is provided on a multiple disk carrier of a multiple disk clutch;

wherein the locking toothing is provided on a toothed rim fastened to the multiple disk carrier, wherein the toothed rim has a connecting toothing which, while fixing the toothed rim to a multiple disk carrier section of the multiple disk carrier in a rotationally fixed manner, engages with one of the toothings of a support wall, and the connecting toothing and the toothing of the support wall form an axial plug connection.

2. The parking lock according to claim 1, wherein the locking toothing is provided in such a way that it faces outwards in the radial direction.

3. The parking lock according to claim 1, wherein the multiple disk clutch is designed as a concentric dual multiple disk clutch with an inner clutch and an outer clutch, wherein the multiple disk carrier is a multiple disk carrier of the outer clutch.

4. The parking lock according to claim 1, wherein the locking toothing on the multiple disk carrier section is formed in one piece with the multiple disk carrier.

5. The parking lock according to claim 4, wherein the locking toothing on the multiple disk carrier section is formed by one of the toothings of the support wall.

6. The parking lock according to claim 1, wherein the locking toothing is provided on the toothed rim fastened to the multiple disk carrier section of the multiple disk carrier.

7. The parking lock according to claim 1, wherein the multiple disk clutch is arranged in a fixed clutch housing, wherein the locking lever is arranged on the clutch housing so as to be pivotable between the release position and the locking position.

8. The parking lock according to claim 1, wherein the locking lever comprises a locking tooth which, in the locking position, engages with a space between teeth of the locking toothing on the toothed rim, wherein the locking lever has two or more locking teeth that engage with two or more separate spaces between teeth of the locking toothing on the toothed rim when the locking lever is in the locking position, and/or the locking lever forms a first locking lever and a second locking lever is also provided.

9. The parking lock according to claim 8, wherein the locking lever forms a first locking lever and a second locking lever is also provided.

10. The parking lock according to claim 9, wherein the second locking lever is pivotable in the opposite direction to the first locking lever between the release position and the locking position.

11. The parking lock according to claim 9, wherein the locking toothing is supportable or supported in a first circumferential direction, on the first locking lever in its locking position and in a second circumferential direction opposite the first circumferential direction, on the second locking lever in its locking position.

12. The drive train for a motor vehicle having a drive unit and a parking lock according to claim 1, wherein the multiple disk clutch has at least one input side in rotary driving connection with the drive unit and an output side in rotary driving connection with a first vehicle axle, which can be brought selectively into rotary driving connection with one another, wherein the multiple disk carrier forms the input side or the output side and/or the drive unit is in rotary driving connection with a second vehicle axle, bypassing the multiple disk clutch, and/or the first and/or second vehicle axle is in rotary driving connection via a differential gear.

13. The drive train according to claim 12, wherein the drive unit is an electric motor or an electric machine.

14. The drive train according to claim 12, wherein a 2-speed transmission is arranged between the drive unit and the multiple disk clutch designed as a concentric dual multiple disk clutch, wherein a first transmission output shaft of a first gear is in rotary driving connection with an input side of the inner clutch and a second transmission output shaft of a second gear is in rotary driving connection with an input side of the outer clutch.

15. The drive train according to claim 12, wherein the drive unit is an electric drive unit.

16. The parking lock according to claim 1, wherein the multiple disk carrier is formed as an outer multiple disk carrier section having a support wall forms a toothing pointing inwardly in the radial direction and a toothing pointing outwardly in the radial direction, and wherein the locking toothing on the toothed rim has a connecting toothing facing radially inward which engages the toothing portion pointing outwardly in the radial direction on the support wall.

17. The parking lock according to claim 1, wherein the multiple disk clutch is designed as a concentric dual multiple disk clutch with an inner clutch and an outer clutch, wherein the multiple disk carrier is an outer multiple disc carrier of the outer clutch.

18. The parking lock according to claim 1, wherein the locking toothing on the multiple disk carrier section is formed in one piece with the multiple disk carrier section of the multiple disk carrier.

19. The parking lock according to claim 1, wherein the multiple disk clutch is arranged in a fixed clutch housing, wherein the locking lever is pivotable by means of a locking roller or a locking cone.

20. The parking lock according to claim 1, wherein the locking lever forms a first locking lever and a second locking lever is also provided.

* * * * *